(12) United States Patent
Tornqvist et al.

(10) Patent No.: US 8,108,788 B2
(45) Date of Patent: *Jan. 31, 2012

(54) METHOD AND AN ARRANGEMENT FOR SCROLLABLE CROSS POINT NAVIGATION IN A USER INTERFACE

(75) Inventors: Tomas Tornqvist, Atvidaberg (SE); Hans Marmolin, Linkoping (SE); Kristofer Lindblom, Linkoping (SE); Jakob Lindblom, Linkoping (SE); Bengt Ahlstrom, Linkoping (SE)

(73) Assignee: Nokia Corporation, Espoo (FI)

( * ) Notice: Subject to any disclaimer, the term of this patent is extended or adjusted under 35 U.S.C. 154(b) by 677 days.

This patent is subject to a terminal disclaimer.

(21) Appl. No.: 11/854,519

(22) Filed: Sep. 12, 2007

(65) Prior Publication Data

US 2008/0005687 A1 Jan. 3, 2008

Related U.S. Application Data

(63) Continuation of application No. 09/959,127, filed as application No. PCT/EP00/03637 on Apr. 20, 2000, now Pat. No. 7,293,241.

(30) Foreign Application Priority Data

Apr. 22, 1999 (SE) ........................................ 9901443

(51) Int. Cl.
  *G06F 3/048* (2006.01)
(52) U.S. Cl. ........ 715/767; 715/721; 715/781; 715/783; 715/784; 715/786; 715/794; 715/802; 715/810; 715/833; 715/841; 715/860; 715/973; 715/974

(58) Field of Classification Search .................. 715/721, 715/767, 781, 783, 784, 786, 794, 802, 810, 715/825, 829, 833, 841, 860, 973, 974

See application file for complete search history.

(56) References Cited

U.S. PATENT DOCUMENTS

| 5,059,965 | A | 10/1991 | Geiser |
| 5,196,838 | A | 3/1993 | Meier et al. |
| 5,283,560 | A | 2/1994 | Bartlett |

(Continued)

FOREIGN PATENT DOCUMENTS

EP 0645604 A 3/1995

(Continued)

OTHER PUBLICATIONS

English translation of Japanese Patent Publication No. 05-298049, dated Dec. 11, 1993, listed above as Foreign Patent Document.

(Continued)

*Primary Examiner* — Doon Chow
*Assistant Examiner* — Shen (Connie) Shiau
(74) *Attorney, Agent, or Firm* — Banner & Witcoff, Ltd.

(57) ABSTRACT

The invention relates to a method and an arrangement for scrollable cross point navigation on a user interface in order to select a feature by combining object fields. Bars where at least one of them is scrollable, have object fields which overlap and combine each other when scrolled or put to a visible focus area in the user interface at the cross point of the bars. Object fields in the focus area select a feature connected to a combination of fields, which is chosen by a confirmation action.

20 Claims, 3 Drawing Sheets

U.S. PATENT DOCUMENTS

| | | | |
|---|---|---|---|
| 5,289,573 | A | 2/1994 | Harada et al. |
| 5,339,391 | A | 8/1994 | Wroblewski et al. |
| 5,553,225 | A | 9/1996 | Perry |
| 5,623,613 | A | 4/1997 | Rowe et al. |
| 5,655,094 | A * | 8/1997 | Cline et al. .................... 715/786 |
| 5,659,333 | A | 8/1997 | Okishima |
| 5,677,708 | A | 10/1997 | Matthews, III et al. |
| 5,745,717 | A * | 4/1998 | Vayda et al. .................. 715/834 |
| 5,864,330 | A | 1/1999 | Haynes |
| 5,874,961 | A | 2/1999 | Bates et al. |
| 6,005,601 | A | 12/1999 | Ohkura et al. |
| 6,445,398 | B1 | 9/2002 | Gerba et al. |
| 6,538,672 | B1 | 3/2003 | Dobbelaar |
| 6,678,891 | B1 | 1/2004 | Wilcox et al. |
| 2004/0207648 | A1 * | 10/2004 | Cox et al. ..................... 345/684 |

FOREIGN PATENT DOCUMENTS

| | | |
|---|---|---|
| JP | 05298049 | 12/1993 |
| JP | 09204286 | 5/1997 |

OTHER PUBLICATIONS

English translation of Japanese Patent Publication No. 09-204286, dated May 8, 1997, listed above as Foreign Patent Document.

European Office Action for Application No. 02026640.9, mailed Jul. 6, 2010, 5 pages.

Notification of Grounds of Rejection for Japanese Patent Application No. 2000-614108 (Appeal No. 2008-4407), mailed Aug. 18, 2010.

Notification of Grounds of Rejection for Japanese Patent Application No. 2007-107568, mailed Oct. 12, 2010.

* cited by examiner

METHOD AND AN ARRANGEMENT FOR SCROLLABLE CROSS POINT NAVIGATION IN A USER INTERFACE

CROSS-REFERENCE TO RELATED APPLICATIONS

This application claims priority from co-pending U.S. application Ser. No. 09/959,127, entitled "METHOD AND AN ARRANGEMENT FOR SCROLLABLE CROSS POINT NAVIGATION IN A USER INTERFACE," filed Mar. 7, 2002, which is a national phase application of PCT Application No. PCT/EP00/03637, having an international filing date of Apr. 20, 2000, which claims priority from Swedish Application No. 9901443-3, filed Apr. 22, 1999.

TECHNICAL FIELD

The present invention pertains to a method and an arrangement for scrollable cross point navigation in a user interface in order to select a feature by combining two object fields each belonging to each one bar.

PRIOR ART

Traditional selection of services or adjustment of, for example, TV, set-top box, domestic appliances settings, and other like device settings has the disadvantage of covering an entire display area and requiring a lot of key-presses. This constitutes a major problem for most users of such equipment, but especially for disabled persons and those who are unfamiliar with or insecure in setting electronic devices, or in reading manuals.

Another problem with currently used device settings, relating to manuals, is the language used in the manuals. It is often written in a technical logic language easy to understand for a technician, but perhaps hard to grasp for others.

Furthermore, some devices sold do not have a manual teaching settings in a language of a buyer of the same, or in a language of a non-native purchaser. Still further, it is a well known fact that remote control devices, such as for the setting of TV-sets, are crowded with keys, and that the design of key pads is different between different manufacturers of like devices.

Hence, it is believed that an easy interface for the setting of appliances is needed to overcome drawbacks and problems related to current appliance control interfaces.

SUMMARY OF THE DESCRIBED INVENTION

An aspect of the present invention is to provide a method and an arrangement that brings a solution to above problems and others related to the setting of appliances controlled by remote control devices such as wireless and pointing devices or even voice control devices. Suitable appliances to be controlled include, e.g. television sets, satellite receivers, set-top boxes, computers, household equipment (i.e., apparatus), telephones, mobile phones, personal digital assistants, CD-players, stereo equipment, etc., especially appliances provided with user interfaces such as display screens for interaction with remote control and other key pad devices.

In order to present a solution to said problems the present invention sets forth a method for scrollable cross point navigation on a user interface in order to select a feature by combining two object fields. Two bars are provided, in which at least one of them is scrollable, each of them having at least one object field in which object fields of both become overlapped and are combined when scrolled to a visible focus area in the user interface at the cross point of the bars. Thus, it is accomplished that object fields in the focus area select a feature connected to the combination of fields when chosen by a confirmation action.

In one embodiment of the invention, one feature function is defined as a sub cross point navigation method, i.e., another level of scrollable cross point navigation.

Another embodiment of the invention provides object fields that are visible, but where some may be invisible object fields in the bars, which are connected in a cyclic manner to each other.

Scrolling is accomplished by feeding or "zapping" up and down or left or right in order to move objects to the focus.

In still another embodiment an information field is displayed in the user interface comprising text describing the feature connected to the focus area.

In yet another embodiment the focus area is marked.

Yet in another embodiment of the invention, the bars are small thus making an image display on the screen possible even when all bars are visible. Also, the bars may be visibly transparent.

Preferably, in one embodiment, features in bar object fields are displayed in sequence in object fields in one of the bars when focus is confirmed.

An embodiment comprises that confirmation and scroll action is accomplished by actuating one of five function commands left, right, up, down, and OK or like confirmation.

In a further embodiment the focus area is enabled to show (bring about) all functions for any apparatus guided by cross point navigation through the function commands.

Furthermore, the present invention sets forth an arrangement for scrolled cross point navigation on a user interface in order to select a feature by combining two object fields, whereby it comprises:

two bars, where at least one of them is scrollable, each of them having at least one object field in which object fields of both become overlapped and are combined when scrolled to a visible focus area in the user interface at the cross point of the bars; and whereby object field means are used to select a feature connected to the combination of object fields in the focus area, the feature being chosen by confirmation and scrolling means.

One embodiment of the invention comprises that said object field means is an interaction interpreter between said input device and a graphic generator which is connected to a graphic library for creating the bars and by them comprising function features or finite features.

Another embodiment comprises that said object field means further includes a content database connected to said graphic generator and a user interface objects database connected to said library and to said generator.

One embodiment includes that the arrangement according to the present invention is comprised in a set-top box.

The arrangement of the present invention is also able to accomplish embodiments of said method as claimed in the attached dependent arrangement claims.

BRIEF DESCRIPTION OF THE DRAWINGS

For a more complete understanding of the present invention and for further aspects and advantages thereof, reference may now be had to the following description taken in conjunction with the accompanying drawings, in which.

DETAILED DESCRIPTION OF PREFERRED EMBODIMENTS

The present invention relates to a method and an arrangement for scrollable cross point navigation on a user interface in order to select a feature comprised in a combination of two object fields. A cross point navigation ensures a creation of a system that allows a user of appliances such as digital TV set-top boxes to navigate and select different types of services in an easy way without disturbing the actual viewing experience of the user. It is also designed to assist the user in the forthcoming expansion of both TV-channels and digital TV Services. There is a clear need for a system allowing cross point navigation as described.

Although the detailed description of the preferred embodiments of the present invention is given by way of the setting control of a digital TV set-top box, the present invention is not to be construed as being restricted to such appliances. All kinds of appliances with key pads, wireless or other remote control functions can make use of the present invention, especially if they are equipped with a user interface such as a screen or display area and other interfaces where the control of an appliances is visually prompted. A Cross point navigation system according to the present invention could be used in many other contexts where the display area is important to the user. The system could be displayed in infinite ways, allowing it to be adaptable for most cases of operation. Expansion possibilities of the system are unlimited which allows users to understand and interact with the system in very complex environments and still feel confident that they are in full control of the interaction.

Cross point navigation is meant to allow a user of an appliance as much control as possible. Navigation principles according to the present invention allow the user to navigate to, e.g., a TV channel or Service, herein described as features, desired with only four navigation keys on a remote control device. No confirmation is required until the requested object is in focus.

This is accomplished by pressing, for example, an Ok button or the like on the remote control.

Also, cross point has the benefit of being easily adaptable by users. Interaction is self-explanatory and once a user has made a first selection it then becomes obvious on how to proceed with other system possibilities of it. Every step of the interaction provides an immediate feedback.

Figure 1:
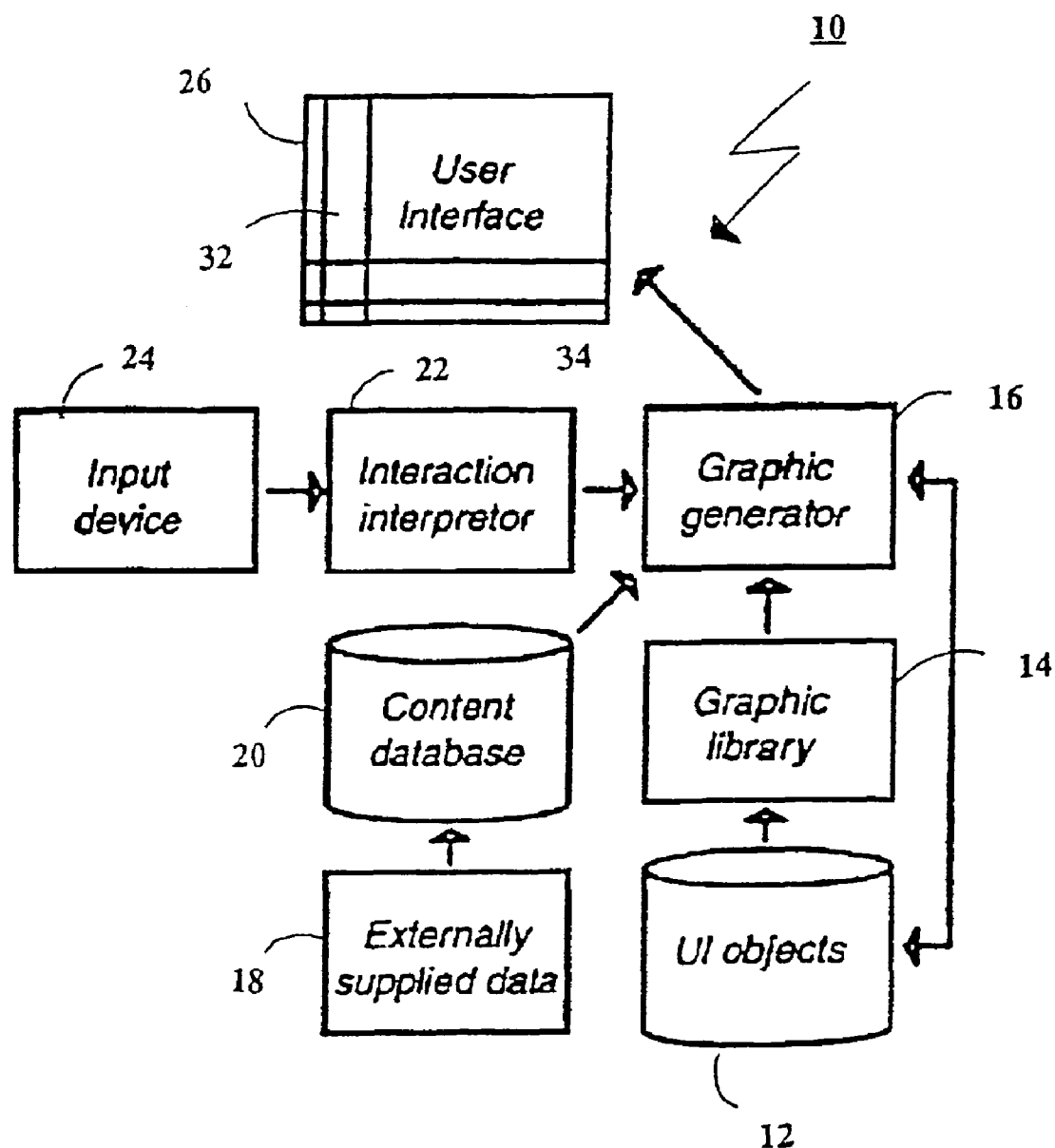
FIG. 1 is a schematic block diagram illustrating one embodiment of means used to accomplish an arrangement in accordance with the present invention.

Illustrated in FIG. 1 is a schematic block diagram showing the means used to accomplish an arrangement 10 in accordance with one embodiment of the present invention comprising a UI objects database 12, a Graphic library 14, a Graphic generator 16, an Externally supplied data means 18, a Content database 20, an Interaction interpreter 22, an Input device 24, and a User Interface 26.

The Input device 24 depicted in FIG. 1 is a means for controlling a User Interface 26. For example, although not limited thereto, Input device 24 may be a remote control for a set-top box, a keyboard for a PC or a control panel for a microwave oven. When a user wants to change the setting of the Interface 26 it is manipulated to transmit a signal to an Interaction interpreter 22.

An Interaction interpreter interprets signals from the Input device 24 and sends a corresponding action to a Graphic generator 16. The Interaction interpreter 22 transforms commands from the Input device 24 to actions provided by the Graphic generator 16.

Furthermore, a Content database 20 is provided that contains information which can be presented in the User Interface 26. Samples of such information could be e.g. names of object fields (shown in FIGS. 2*a* and 2*b*) containing function objects or finite objects and help-texts that should be presented to users in a given context. A function object is mostly a more complex setting not directly leading to a setting of a feature for an appliance and a finite object mostly leads to a direct setting of a feature for an appliance. All material in the Content database 20 can be altered or edited by a content provider.

Externally supplied data 18 is a symbolic representation of any content that is inserted into the Content database 20 from any source.

Still further, the UI objects 12 database contains types of graphical objects that can be presented in the User Interface 26. Said database supplies a Graphic library 14 with generic representations of said types. Hence, the Graphic library 14 contains functions to manipulate the UI objects in the Interface 26. It supplies the Graphic generator 16 with specific instances from the UI objects 12 database.

The Graphic generator 16 handles the presentation of the User Interface 26 as well as manipulation accomplished by a user. Thereby it performs actions signaled by the Interaction interpreter 22 through collecting content from the Content database 20 and by merging the content with the Graphic library 14 and delivering presentation of a desired action to the User Interface 26. The User Interface 26 presents feedback of any action performed by users of the Interface 26.

Figure 2A:
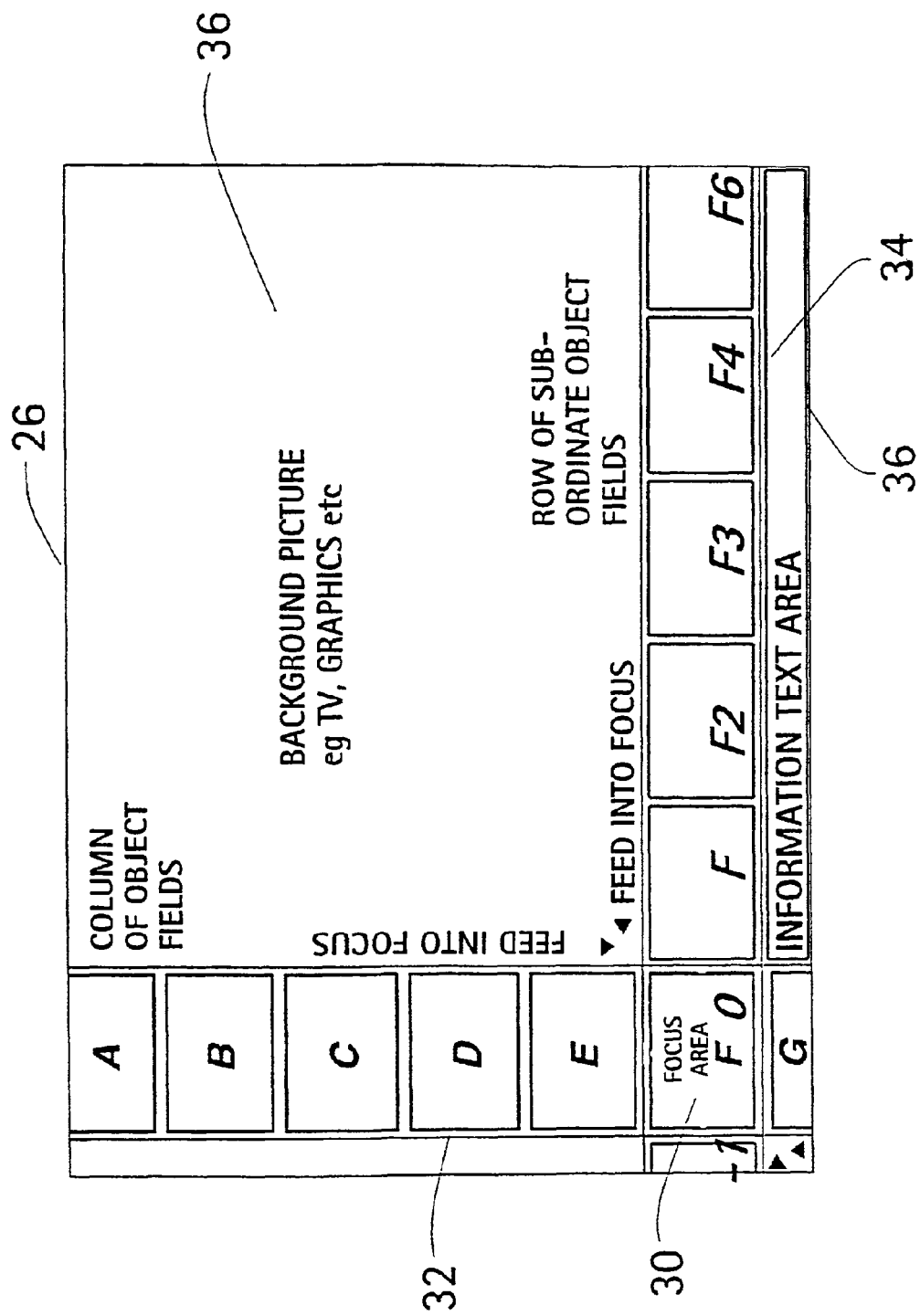
FIGS. 2*a* and 2*b* schematically illustrate a user interface in accordance with the present invention.
Figure 2B:
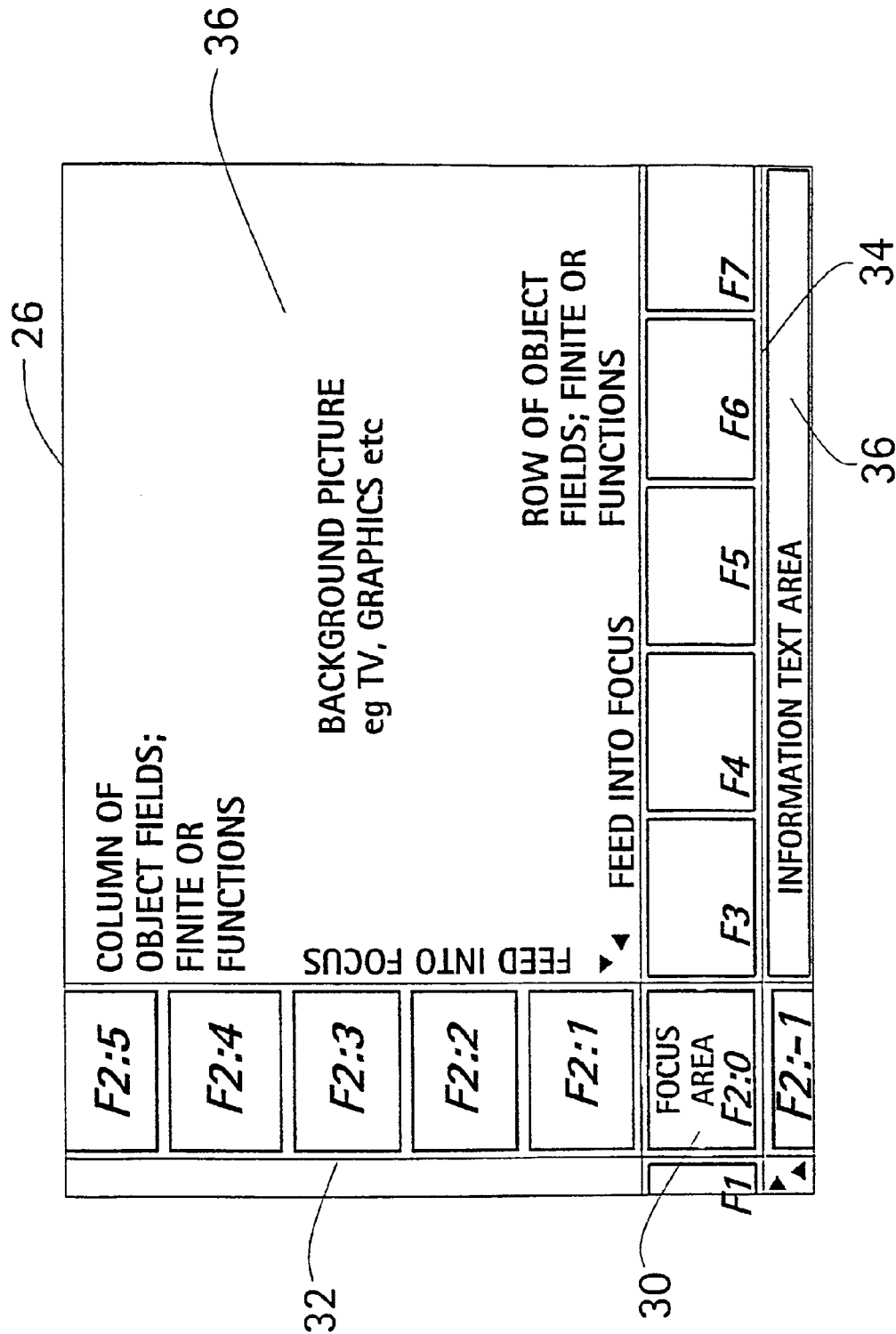

FIGS. 2*a* and 2*b* are schematically illustrating a user interface 26 in accordance with the present invention.

A user of an Interface 26 through the Input device 24 may, for example, select a combination of an object field comprising objects such as function features defining a setting and a finite object field comprising finite features, by feeding the object field comprising functions or the finite object field comprising finite features into a focus area 30 with the User Interface 26. If a field with function features is located in a vertical bar, including object fields A-G in FIG. 2*a*, is in focus 30 its function features/finite features are displayed in the horizontal bar 34. Likewise if a function feature in the horizontal bar 34, including object fields F0-F5 in FIG. 2*a*, is in focus 30, its finite features/function features are displayed in the vertical bar 32. Whenever an object field comprising objects such as function features associated with one bar 32(34) is fed into the focus area 30 its content overwrites the content of the other bar 34(32).

Such interaction allows a user to navigate to a desired combination of object fields, e.g., A-G and F0-F5 (shown in FIG. 2*a*), A0-A5 (not shown), D0-D5 (not shown) etc without requiring the manipulation of keys other than the Right, Left, Up and Down keys on a keyboard or pad. A user then selects combined features in focus 30 by using a manipulation key or button such as Ok, confirm, select etc.

According to the above a user can interact with the cross point method and/or arrangement according to the present invention in a zapping mode as compared to the prior art in which interaction is in accordance with a channel list.

Further, in one embodiment of the invention only the Focus Area 30 and an information field 36, not entire bars 32, 34 are displayed in the user interface 26. Also, if entire bars 32, 34 are shown they can be transparent, thus allowing a more detailed view of a background picture e.g. TV picture 36, graphics etc. Bars 32, 34 do not necessarily need to be elongated in a straight line. Rather, the important feature is that the so called bars 32, 34 make up a focus area 30 when crossing each other. Moreover, the focus area 30 may be marked, highlighted, shadowed etc, making it easier to observe for users.

FIG. 2b illustrates an example of one possible change in the bars 32, 34, A-G and F0-F5 in FIG. 2a, when object fields F0 and F2 are combined in focus 30 making up object field F2:0 in focus 30. The combination was accomplished by feeding the bar 34 object field F2 to the focus area 30, thus overwriting object field F0 in bar 32, which combination makes up a vertical bar 32 with new object fields F2:0-F2: 5. The feeding direction is indicated by index 2:0 in F2:0, i.e., horizontal bar 34 fed to focus and F2 overlapping F:0.

Let us now refer to FIGS. 2a and 2b as an example of one possible embodiment of the present invention of setting a feature for a TV set equipped with a set-top box. Supposing that the vertical object field F0 in FIG. 2a comprises or contains the finite feature of making up a personal TV program or channel list with channels listed from program places 1,2,3,4..., and that the horizontal object field F2 contains the finite feature of channel CNN™. Hence, by feeding the field F2 to F0 with the key for left or right (circular bars) feeding with a key pad and thus overlapping field F0 and confirming the setting by pressing a confirmation key it is accomplished that object fields A-F0 in the vertical bar 32 are changed to comprise the object fields F2:0-F2: 5 which contain a sequence of finite features defining a place in a personal channel list. By feeding F2:1 with the down or up key of the key pad 24 down to the focus area 30 and pressing the confirmation key, the channel CNN ™ is placed at position 1 in the personal channel list.

Moreover, giving an example of a function feature for a set-top box, such a function could be to arrange all news channels available in series at a special position in the channel list, for example, at program positions 10-15 in the personal channel list. This would be accomplished automatically when confirming the function feature with a confirmation key.

Summarized, the invention may be described as follows:

An electronic apparatus comprises a display on which a focus area is provided. The focus area is dedicated to display information which is necessary for a user to control the functions of the electronic apparatus.

The information to be shown to the user is divided into a number of individual items. These items are arranged in one or more levels. In any of the levels, the accompanying items are of similar detail.

The items of a first level are very general. In a second level, the items are more detailed than in the first level, but are still somewhat of a general scope. In a third level, the items are even more detailed than in the second level. And so on.

Furthermore, the items are linked according to their contents. This means that an item of the first level is linked to one or more items of the second level. As well, an item of the second level is linked to one or more items of the third level. And so on.

The items to be shown to the user may, therefore, be arranged as follows:

| | |
|---|---|
| first level: | ABCDE... |
| second level: | A0 A1 A2 ... B0 B1 ... C0 C1 ... D0 ... E0 ... |
| third level: | A0:0 A0:1 ... B0:0 B0:1 C0:0 ... D0:0 ... |
| fourth level: | ... | wherein A, B, C, ... A0, A1, ... B0, ... A0:0, A0:1, ... are items in the various levels, and A, A0, A0:1 ... are items which are linked together wherein the linkage is expressed by the use of the same character.

With the above described structure, the items are arranged in a tree-like manner with any branch of the tree constituting a further level.

The electronic apparatus is provided with an input device for changing the items shown in the focus area. With this input device, a user is able to change the items of the focus area as follows:

On one hand, the user may change the items of the focus area within one and the same level. In this case, the user may change e.g. from A to B to C or from C1 to C0 or the like.

On the other hand, the user may change the items of the focus area from one level to another. In this case, the user may change e.g. from B to B1 or from D0:2 to D0 to D or the like.

For changing between the items of the various levels, there are at least two keys provided on the input device. The user may start to change between the items of the first level by pressing the first key. Then, for changing to the second level, the second key is pressed. For changing between the items of the second level, the user continues to press the second key. Then, for changing to the third level, the first key is used again. For changing between the items of the third level, the user continues to press the first key. And so on.

As a result, the user may start with item A in the first level and may change within this level to all other items B, C, ... of this level by pressing the first key. Doing that, the user is able to read all items of this level and to select that item which is actually important for her/him. The selection is performed by bringing the important item into the focus area of the display.

If the important item is within the focus area, the user may change to the second level by pressing the second key. Due to the fact that the user has selected a specific item of the first level before changing to the second level, the displayed items in the second level are all linked to this specific item of the first level. For example, if the user has selected item C in the first level, one of the linked items C0, C1, C2, ... of the second level is displayed after pressing the second key.

Then, the user may change within this second level to all linked items C0, C1, C2, ... of this second level by pressing the second key. The user may select that item which is important for her/him. This selection is performed by bringing the important item into the focus area of the display. If the important item is within the focus area, the user may change to the third level by pressing the first key again. And so on.

This leads to the following example of subsequent changes of items in the focus area:

| | |
|---|---|
| A | first key |
| B | first key |
| C | second key |
| C0 | second key |
| C1 | second key |
| C2 | second key |
| C3 | second key |
| C4 | first key |
| C4:0 | first key |
| C4:1 | first key |
| C4:2 | ... |
| ... | |

With such a sequence of changes of items within the focus area, the user is able to select at the end that item which corresponds to the function of the electronic apparatus required by the user. Then, the user presses, e.g., a confirmation key on the input device so that the required function is performed by the electronic apparatus.

As long as there is a possibility to change from one level to a next lower level, a combination of two items of these two levels is displayed in the focus area. The first item of the combination belongs to that level in which the user is actually performing changes. The first items, therefore, correspond to the items as described above. The second item of the combination of two items belongs to the next lower level. The two items to be displayed are linked together as described above.

As examples, the following combinations of two items may be displayed in the focus area:

B+B1
F+F0
D3+D3:5.

With the described first key of the input device, the user may change the combination displayed in the focus area as follows:

| | |
|---|---|
| B + B 1 | first key |
| C + C 1 | first key |
| D + D1 | ... |
| ... | |

This means that the first key enables the user to change between the items of the first level.

With the described second key of the input device, the user may change the combination displayed in the focus area as follows:

| | |
|---|---|
| B + B 1 | second key |
| B 1 + B1:0 | second key |
| B 1 + B1:1 | second key |
| B1 + B1:2 | ... |
| ... | |

This means that the user may change with the second key from the first level into the second level and may then change between items of the second level.

If the user then presses the first key again, the combination displayed in the focus area includes items of the second and the third level and the user may then continue to change between items of the third level by pressing the first key.

Therefore, with any of the two keys, the user may change from a given level to the next lower level and may then change between the items of this lower level.

In the lowest level, there is only one item of this level being displayed in the focus area, e.g., F2:0. This item may then be selected by the user with the confirmation key of the input device, as already described.

Furthermore, it is possible to display not only the focus area but also a number of additional areas on the display of the electronic apparatus. These additional areas may be displayed as a vertical bar and a horizontal bar as shown in FIGS. 2a and 2b.

In this case, one item is displayed in any of the additional areas and the items displayed in the additional areas of the vertical bar belong to the next higher or lower level as the items in the additional areas of the horizontal bar.

If the user changes the item in the focus area, a shift of the vertical bar including the focus area or a shift of the horizontal bar including the focus area is performed. Such shifting or scrolling has the result that always that item is transferred into the focus area which was displayed as the neighboring item of the focus area in the vertical or horizontal bar prior to the shift.

The shifting or scrolling may be performed in both directions of the vertical and horizontal bar. For that purpose, the input device may provide four keys, i.e., an up and a down key for the vertical bar and a left and a right key for the horizontal bar.

With these four keys, it is also possible that the user also goes back to a higher level, e.g. from C4:1 to C4.

With these four keys of the input device, the user may change the combination displayed in the focus area as follows:

| | |
|---|---|
| G + G0 | down key |
| F + F0 | down key |
| E + E0 | left key |
| E0 + E0:0 | left key |
| E1 + E1:0 | left key |
| E2 + E2:0 | right key |
| E 1 + E1:0 | up key |
| E + E 1 | up key |
| F + F1 | left key |
| F 1 + F1:0 | left key |
| F2 + F2:0 | down key |
| F2:0 | down key |
| F2:1 | down key |
| F2:2 | confirmation key, | wherein in the last three lines of the above example, no combination of two items is displayed as F2:0, F2:1, F2:2 relate to the lowest level. As a result of the example, the item F2:2 is selected by the user.

It is thus believed that the operation and construction of the present invention will be apparent from the foregoing description. While the method and arrangement shown or described has been characterized as being preferred, it will be obvious that various changes and modifications may be made therein without departing from the spirit and scope of the invention as defined in the attached claims.

We claim:

1. An apparatus comprising:
a processor; and
memory operatively coupled to the processor and storing computer readable instructions that, when executed, causes the apparatus to:
generate an interface comprising a first scrollable bar having a first object field and a second scrollable bar comprising a second object field;
scrolling the first object field into a focus area;
scrolling the second object field into the focus area such that first object field overlaps the second object field; and
combining the first object field and the second object field in the focus area.

2. The apparatus of claim 1, wherein the first object field is subordinate to the second object field.

3. The apparatus of claim 1, wherein the first scrollable bar and the second scrollable bar each comprise at least one of function features and finite features.

4. The apparatus of claim 1, wherein the focus area is further configured to modify the first scrollable bar.

5. The apparatus of claim 4, wherein the focus area is further configured to modify the first object field of the first scrollable bar according to data associated with the second object field.

6. A method comprising:
receiving, by an apparatus, a first request to scroll a first scrollable bar in an interface such that a first object field of the first scrollable bar is moved into a focus area;

receiving, by the apparatus, a second request to scroll a second scrollable bar such that a second object field of the second scrollable bar is moved into the focus area and overlaps the first object field in the focus area; and combining, by the apparatus, the first object field and the second object field in the focus area.

7. The method of claim 6, wherein the first object field is subordinate to the second object field.

8. method of claim 6, wherein combining the first object field and the second object field in the focus area comprises modifying the first scrollable bar.

9. The method of claim 8, wherein modifying the first scrollable bar comprises modifying the first object field of the first scrollable bar according to data associated with the second object field.

10. The method of claim 6, wherein the first request and the second request each comprise a direction of scrolling.

11. One or more non-transitory computer readable media storing computer readable instructions that, when executed, cause an apparatus to:
generate an interface comprising a first scrollable bar having a first object field and a second scrollable bar comprising a second object field;
scroll the first object field into a focus area;
scroll the second object field into the focus area such that first object field overlaps the second object field; and
combine the first object field and the second object field in the focus area.

12. The one or more computer readable media of claim 11, wherein the first object field is subordinate to the second object field.

13. The one or more computer readable media of claim 11, wherein the first scrollable bar and the second scrollable bar each comprise at least one of function features and finite features.

14. A method comprising:
generating, by an apparatus, an interface comprising a first scrollable bar having a first object field and a second scrollable bar comprising a second object field;
scrolling, by the apparatus, the first object field into a focus area;
scrolling, by the apparatus, the second object field into the focus area such that first object field overlaps the second object field; and combining, by the apparatus, the first object field and the second object field in the focus area.

15. The method of claim 14, wherein the focus area is further configured to modify the first scrollable bar.

16. The method of claim 15, wherein the focus area is further configured to modify the first object field of the first scrollable bar according to data associated with the second object field.

17. An apparatus comprising:
a processor; and
memory operatively coupled to the processor and storing computer readable instructions that, when executed, cause the apparatus to:
receive a first request to scroll a first scrollable bar in an interface such that a first object field of the first scrollable bar is moved into a focus area;
receive a second request to scroll a second scrollable bar such that a second object field of the second scrollable bar is moved into the focus area and overlaps the first object field in the focus area; and
combine the first object field and the second object field in the focus area.

18. The apparatus of claim 17, wherein combining the first object field and the second object field in the focus area comprises modifying the first scrollable bar.

19. One or more non-transitory computer readable media storing computer readable instructions that, when executed, cause an apparatus to:
receive a first request to scroll a first scrollable bar in an interface such that a first object field of the first scrollable bar is moved into a focus area;
receive a second request to scroll a second scrollable bar such that a second object field of the second scrollable bar is moved into the focus area and overlaps the first object field in the focus area; and
combine the first object field and the second object field in the focus area.

20. The one or more computer readable media of claim 19, wherein combining the first object field and the second object field in the focus area comprises modifying the first scrollable bar.

* * * * *